(12) United States Patent
Kairali et al.

(10) Patent No.: US 11,561,849 B1
(45) Date of Patent: Jan. 24, 2023

(54) INTELLIGENTLY ADAPTIVE LOG LEVEL MANAGEMENT OF A SERVICE MESH

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/568,928

(22) Filed: Jan. 5, 2022

(51) Int. Cl.
*G06F 11/00* (2006.01)
*G06F 11/07* (2006.01)
*G06F 9/54* (2006.01)
*G06F 11/14* (2006.01)

(52) U.S. Cl.
CPC .......... *G06F 11/0781* (2013.01); *G06F 9/547* (2013.01); *G06F 11/079* (2013.01); *G06F 11/1405* (2013.01); *G06F 11/1471* (2013.01); *G06F 11/1479* (2013.01)

(58) Field of Classification Search
CPC ......... H04L 67/01; H04L 67/133; H04L 9/40; G06F 9/547; G06F 11/0781; G06F 11/079; G06F 11/14; G06F 11/1405; G06F 11/1471; G06F 11/1479; G06F 11/2205; G06F 11/3476
See application file for complete search history.

(56) References Cited

U.S. PATENT DOCUMENTS

| 2002/0198983 | A1 | 12/2002 | Ullmann | |
| 2018/0349213 | A1* | 12/2018 | Antony | G06F 11/3476 |
| 2019/0057015 | A1 | 2/2019 | Hassan | |
| 2019/0340059 | A1* | 11/2019 | Bagarolo | G06F 8/71 |

(Continued)

FOREIGN PATENT DOCUMENTS

| CN | 112612675 A | * | 4/2021 |
| KR | 102088285 B1 | * | 3/2020 |

OTHER PUBLICATIONS

Cinque et al., "Microservices Monitoring with Event Logs and Black Box Execution Tracing", Jan./Feb. 2022, IEEE Transactions on Services Computing, vol. 15, No. 1, pp. 294-307 (Year: 2022).*

(Continued)

*Primary Examiner* — Michael Maskulinski
(74) *Attorney, Agent, or Firm* — Christopher M. Pignato

(57) ABSTRACT

Systems, methods and/or computer program products dynamically managing log levels of microservices in a service mesh based on predicted error rates of calls made to the service mesh. A first AI module predicts health, status and/or failures of microservices individually or as part of microservice chains with a particular confidence level. Using health status mapped to the microservices and historical information inputted into a knowledge base (including error rates), the first AI module predicts error rates of the API call for each user profile or generally by the service mesh. A second AI module analyzes the predictions provided by the first AI module and determines whether the predictions meet threshold levels of confidence. To improve (Continued)

the confidence of predictions that are below threshold levels, the second AI module dynamically adjusts application logs of the microservices and/or proxies thereof to an appropriate level to capture more detailed information within the logs.

20 Claims, 9 Drawing Sheets

(56) References Cited

U.S. PATENT DOCUMENTS

| | | | |
|---|---|---|---|
| 2020/0296172 | A1 | 9/2020 | Gunjal |
| 2020/0394167 | A1* | 12/2020 | Garvey .............. G06F 12/0815 |
| 2021/0149790 | A1* | 5/2021 | Renner .............. G06F 11/0778 |
| 2022/0253574 | A1* | 8/2022 | Polaji ...................... G06F 30/20 |

OTHER PUBLICATIONS

Machine translation of CN 112612675 A (Year: 2021).*
Machine translation of KR 102088285 B1 (Year: 2020).*

Campos, Johnathan, "Debugging Microservices with Distributed Tracing and Real-Time Log Analytics", Splunk, downloaded from the internet on Oct. 11, 2021, 3 pages, <https://www.splunk.com/en_us/blog/devops/debugging-microservices-with-distributed-tracing-and-real-time-log-analytics.html>.

Hombergs, Tom, "Tip: Use Logging Levels Consistently", Reflectoring, downloaded from the internet on Oct. 11, 2021, 3 pages, <https://reflectoring.io/logging-levels/>.

Kothawala, Safvan, "Change Log Level in all Kubemetes Pods in One Go without Pod Restart", Medium, Mar. 4, 2020, 4 pages, <https://medium.com/@safvan.kothawala/change-log-level-in-all-kubernetes-pods-in-one-go-without-pod-restart-d7558f450dc0>.

Mell et al., "The NIST Definition of Cloud Computing", Recommendations of the National Institute of Standards and Technology, Special Publication 800-145, Sep. 2011, 7 pages.

Zhou et al., "Latent Error Prediction and Fault Localization for Microservice Applications by Learning from System Trace Logs", 2019 Association for Computing Machinery, ESEC/FSE '19, Aug. 26-30, 2019, Tallinn, Estonia, pp. 683-694.

Zwietasch, Tim, "Online Failure Prediction for Microservice Architectures", Institute of Software Technology Reliable Software Systems, University of Stuttgart, Master's Thesis, Completed: Aug. 7, 2017, 105 pages.

* cited by examiner

INTELLIGENTLY ADAPTIVE LOG LEVEL MANAGEMENT OF A SERVICE MESH

BACKGROUND

The present disclosure relates generally to the field of microservice architecture, and more specifically to service meshes, communication between microservices and dynamic application of log levels within the service mesh to improve error prediction, health monitoring, and efficient runtime configuration of the service mesh.

A service mesh provides a way to control how different parts of an application share data with one another. The service mesh is a dedicated infrastructure layer built right into an application. This visible infrastructure layer can document how well different parts of an application interact with one another, making it easier to optimize communication and avoid downtime as an application grows and changes over time. Each part of the application is called a "service," and the services rely on other services to complete transactions, tasks or other functions requested by users. Modern applications are often broken down into this microservice architecture, whereby a network of services each perform a specific business function. The microservices architecture lets developers make changes to an application's services without the need for a full redeploy. Microservices are built independently, communicate with each other, and can individually fail without escalating into an application-wide outage. In order to execute its function, one service might need to request data from several other services. The service mesh routes requests from one service to the next, optimizing how all the moving parts of the network of microservices work together.

Log files are a primary data source for network observability. A log file is a computer-generated data file that contains information about usage patterns, activities, and operations within an operating system, application, server or another device. Organizations can implement security event monitoring (SEM), security information management (SIM), security information and event management (SIEM), or another analytics tool to aggregate and analyze log files generated in a computing environment, including cloud environments. Log files are automatically computer-generated whenever an event with a specific classification takes place on the network. The reason log files exist is that software and hardware developers find it easier to troubleshoot and debug their creations when they access a textual record of the events that the system is producing. Each of the leading operating systems is uniquely configured to generate and categorize event logs in response to specific types of events and create a timeline of events that take place on the system, including events related to the server, kernel and running applications. Categories of logs may include application logs, event logs, service logs and system logs.

SUMMARY

Embodiments of the present disclosure relate to a computer-implemented method, an associated computer system and computer program products for dynamically managing log levels of application services within a service mesh. The computer-implemented method comprising receiving, by the service mesh, an API call associated with a user profile initiating a transaction to use one or more microservices of the service mesh; analyzing, by the service mesh, historical metrics provided by the microservices of the service mesh; predicting, by the service mesh, the one or more microservices taking part in the transaction initiated by the API call based on the historical metrics; checking, by the service mesh, error rates the user profile historically receives for initiating the API call using specific microservice chains of the service mesh and error rates for individual microservices of the specific microservice chains historically initiated by the API call; mapping, by the service mesh, a health status for the individual microservices of the specific microservice chains historically initiated by the API call to the error rates for the specific microservice chains; predicting, by the service mesh, an error rate for the API call for the user profile based on the error rates the user profile historically receives for initiating the API call, the mapping of the health status and historical error rates of the service mesh; retrieving, by the service mesh, a current log level from each of the individual microservices, and upon the current log level of one or more of the individual microservices being below a threshold log level for the error rate of the API call initiated by the user profile, dynamically changing, by the service mesh, the current log level for one or more of the individual microservices to a new log level, increasing an amount of information captured by logs of the one or more of the individual microservices.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1A:
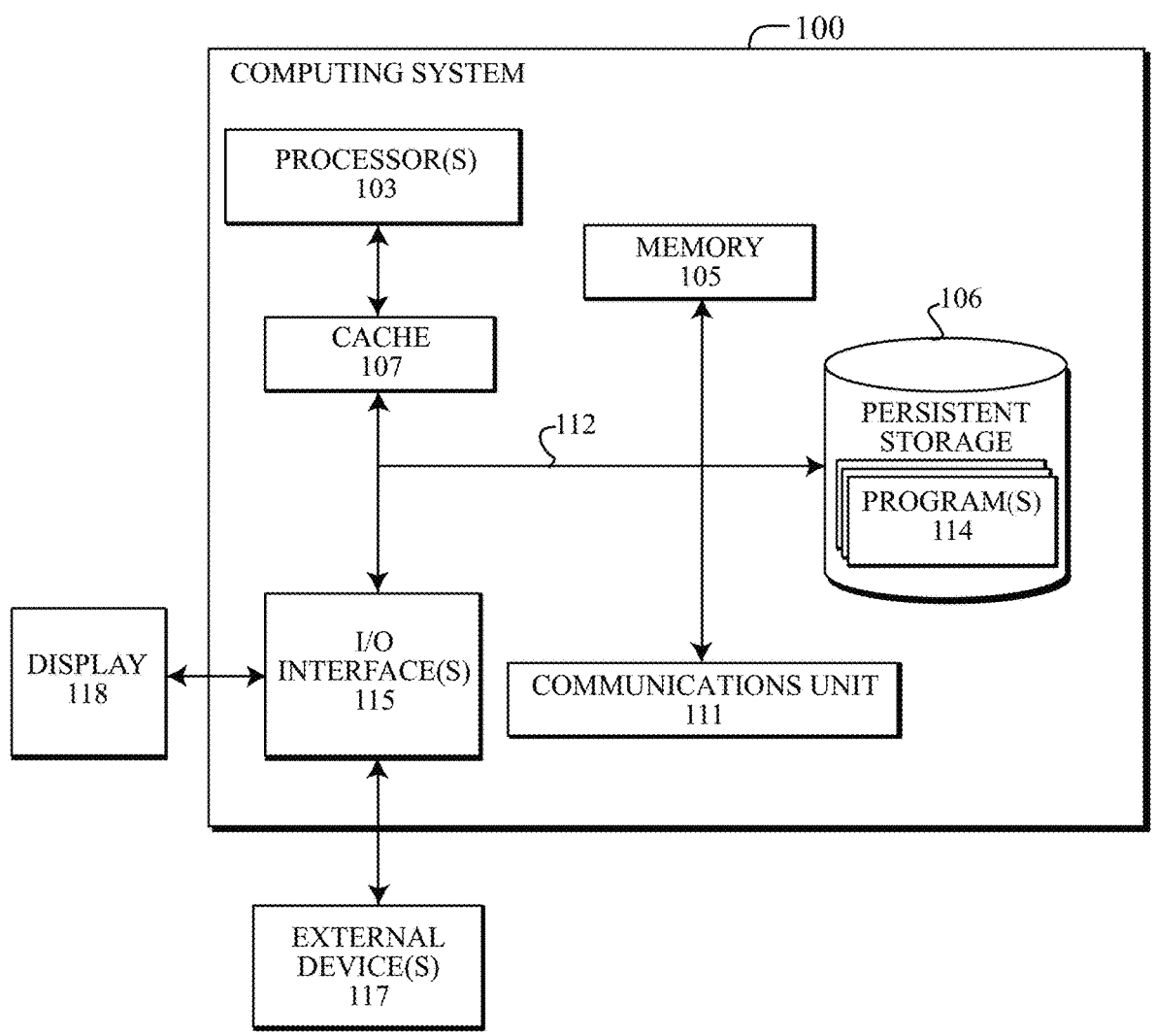
FIG. 1A depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Currently available application management pre-configure the level of log generation using static settings. Administrators of the applications and/or systems hosting the applications, are required to set the level of log generation for any of the applications being executed. However, administrators often must balance the level of log generation with computing resources available because when an application generates a highly detailed level of logging, the application may experience slowdowns. Likewise, applications that do not have a high enough log level and are not logging enough detail about the application may experience difficulties performing various robotic process automation (RPA) activities and/or analysis functions for monitoring the applications being executed. Embodiments of the present disclosure recognize that there is a need for artificial intelligence (AI) enabled systems capable of providing: predictions about the health of the applications being executed, accurate failure predictions for the executed applications before failures occur and dynamic management of log levels to improve details being generated by the application during runtime in order to ensure enough information is provided by the logs to diagnose and/or alleviate application failures that are predicted to occur.

Embodiments of the present disclosure leverage a plurality of artificial intelligence systems running as part of a service mesh to dynamically adjust the level of log details being collected by applications receiving calls to the service mesh in order to fulfill transactions requested by one or more users. The first AI system may be an AI module capable of predicting the health, status and/or failures of application(s) or microservices thereof that are accessible via the service mesh, with a particular level of confidence. The predictions may be made using collected metrics from the service mesh, including information recorded in application logs such as events leading to errors, the types of errors and portions of code or services that may have failed, resulting in the errors. The collected metrics, such as the historical logs documenting errors within the service mesh, may be inputted into a knowledge base compiling a history of the service mesh's transactions and calls, both generally and on a per user profile basis. The history of the compiled knowledge based may include events such as successful transaction completion, application errors of by one or more microservices or microservice chains, the type of error, the module or portion of code that failed, etc. The knowledge base may record errors occurring by the service mesh generally and/or on a per user-profile basis, tracking error rates of the service mesh generally and error rates for each specific user making calls to the service mesh. Using the health status mapped to the individual microservices of the invoked microservice chains of service mesh, and historical information inputted into the knowledge base, (including error rates of the service mesh), the first AI module may predict the error rate of a particular application programming interface (API) call for each user profile and/or generally by the service mesh.

Embodiments of the second AI system may analyze the predictions provided by the first AI system and determine whether or not the predictions meet a threshold level of confidence to satisfy the second AI system that the first AI module's error predictions are accurate enough. For example, the second AI system may review the predicted error rate of the API calls by the first AI system both generally and/or for each user profile. To improve the confidence of the predictions that are below a threshold level, the second AI system may dynamically adjust application logs of the microservices and/or proxies thereof to an appropriate level to capture more detailed information within the logs. In some embodiments, the service mesh can change the log levels at the level of the container or pod hosting the microservice(s). By adjusting the level of logging to a higher level of detail, the amount of information and detail provided in the logs to the corpus of the knowledge base may increase, improving error prediction accuracy toward the threshold level of confidence.

In embodiments where an application error or failure of the microservice chain being invoked is not predicted to occur, the second AI of the service mesh may adjust or re-adjust the log levels for the services of the service mesh (or proxies thereof) downward or back to the previously default level. For instance, once a knowledge base of the first AI is mature enough to accurately predict errors or API call failures of an invoked microservice and/or microservice chain, the log levels of a predictively stable application may be maintained or dynamically reduced by the second AI system. Reducing the overall amount of information captured by the application logs, reducing the impact on performance that higher levels of logging may cause. Moreover, in instances where an application's log level was previously increased by the second AI system to capture additional information about predicted errors or failures, but such errors or failures have not been observed for a threshold period of time, the second AI system may return the higher logging level for the application back to the previous log level before the adaptation the higher log level occurred, or the log level may return to a default log level.

Furthermore, in some embodiments of the service mesh, log levels may be dynamically adjusted in response to failed API calls that may be retried a plurality of times. For example, the service mesh may check the number of retries that are performed for a failed API call. If the retry count is high, the second AI module may trigger a log level adjustment to be performed by the microservices, proxies thereof and/or the pods or containers hosting the microservice. Moreover, if failed API call is able to recover within a specified number of retries within the same transaction, the service mesh may avoid implementing the adjustment to the log levels.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1A illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1A provides only an illustration of one implementation of a computing system 100 and does not imply any limitations regarding the environments in which different embodiments may be implemented. In general, the components illustrated in FIG. 1A may be representative of any electronic device, either physical or virtualized, capable of executing machine-readable program instructions.

Although FIG. 1A shows one example of a computing system 100, a computing system 100 may take many different forms, including bare metal computer systems, virtualized computer systems, container-oriented architecture, microservice-oriented architecture, etc. For example, computing system 100 can take the form desktop computer systems, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 106.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 1B:
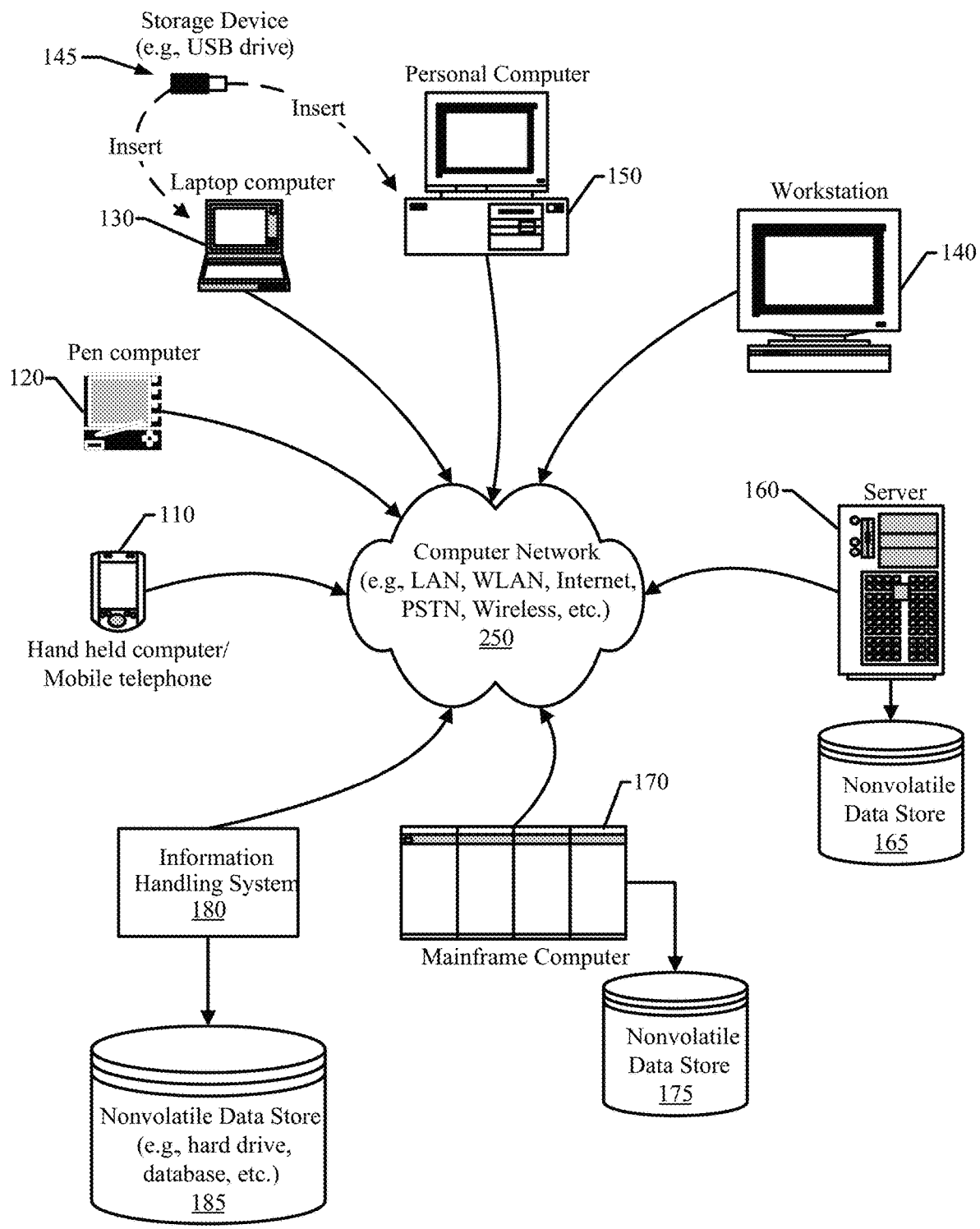
FIG. 1B depicts a block diagram illustrating an extension of the computing system environment of FIG. 1A, wherein the computing systems are configured to operate in a network environment and perform methods described herein in accordance with the present disclosure.

FIG. 1B provides an extension of the computing system 100 environment shown in FIG. 1A to illustrate that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 1B are represented by information handling system 180.

Many of the computing systems can include nonvolatile data stores, such as hard drives and/or nonvolatile memory. The embodiment of the information handling system shown in FIG. 1B includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250 (referred to herein as "network 250"). Types of networks 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
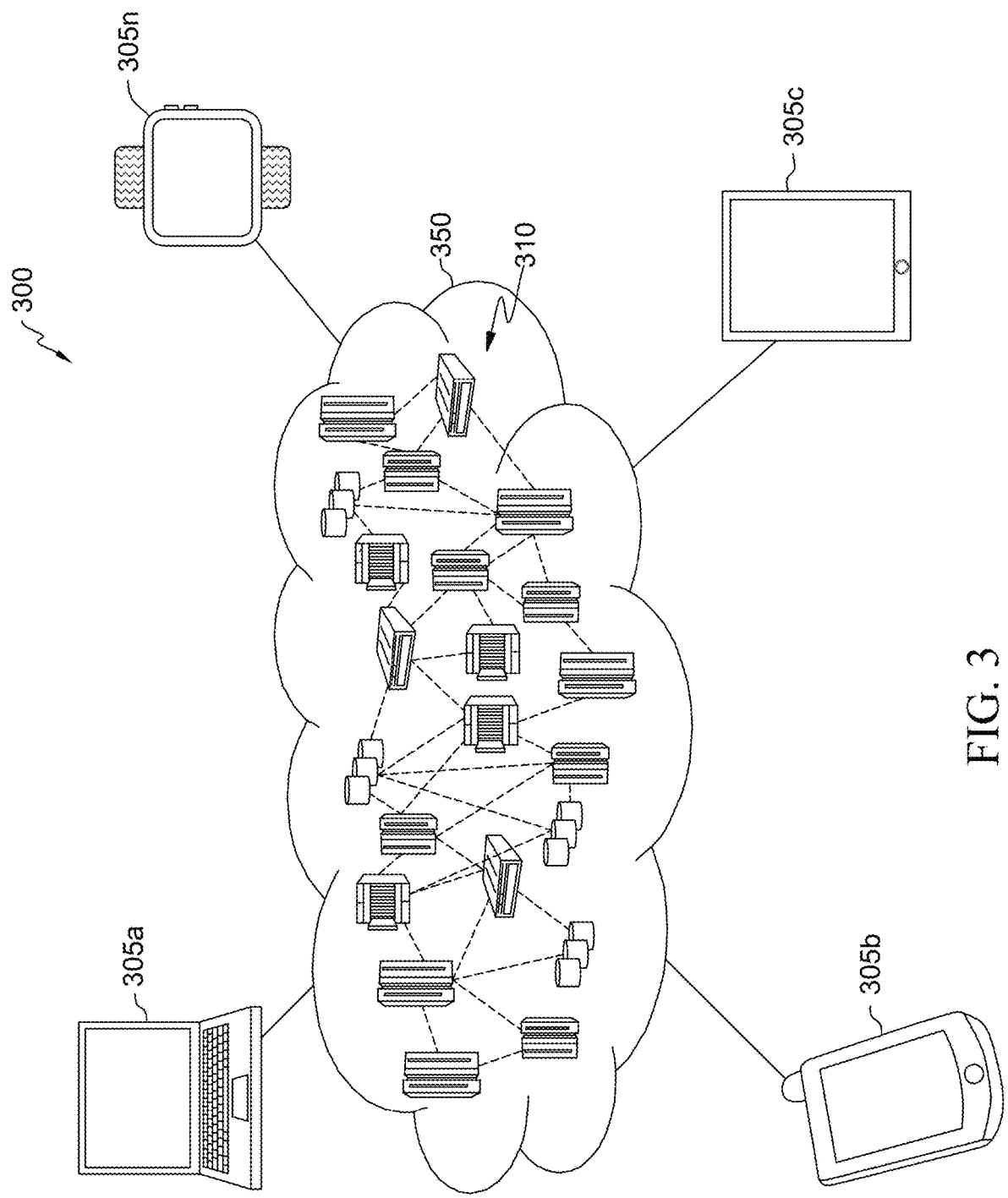
FIG. 3 depicts a block diagram illustrating a cloud computing environment in accordance with the present disclosure.

Referring to the drawings, FIG. 3 is an illustrative example of a cloud computing environment 300. As shown, cloud computing environment 300 includes a cloud network 350 comprising one or more cloud computing nodes 310 with which end user device(s) 305a-305n (referred to generally herein as end user device(s) 305) or client devices, may be used by cloud consumers to access one or more software products, services, applications, and/or workloads provided by cloud service providers or tenants of the cloud network 350. Examples of the user device(s) 305 are depicted and may include devices such as a desktop computer, laptop computer 305a, smartphone 305b or cellular telephone, tablet computers 305c and smart devices such as a smartwatch 305n and smart glasses. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of end user devices shown in FIG. 3 are intended to be illustrative only and that computing nodes 310 of cloud computing environment 300 can communicate with any type of computerized device over any type of network and/or network addressable connection (e.g., using a web browser).

Figure 4:
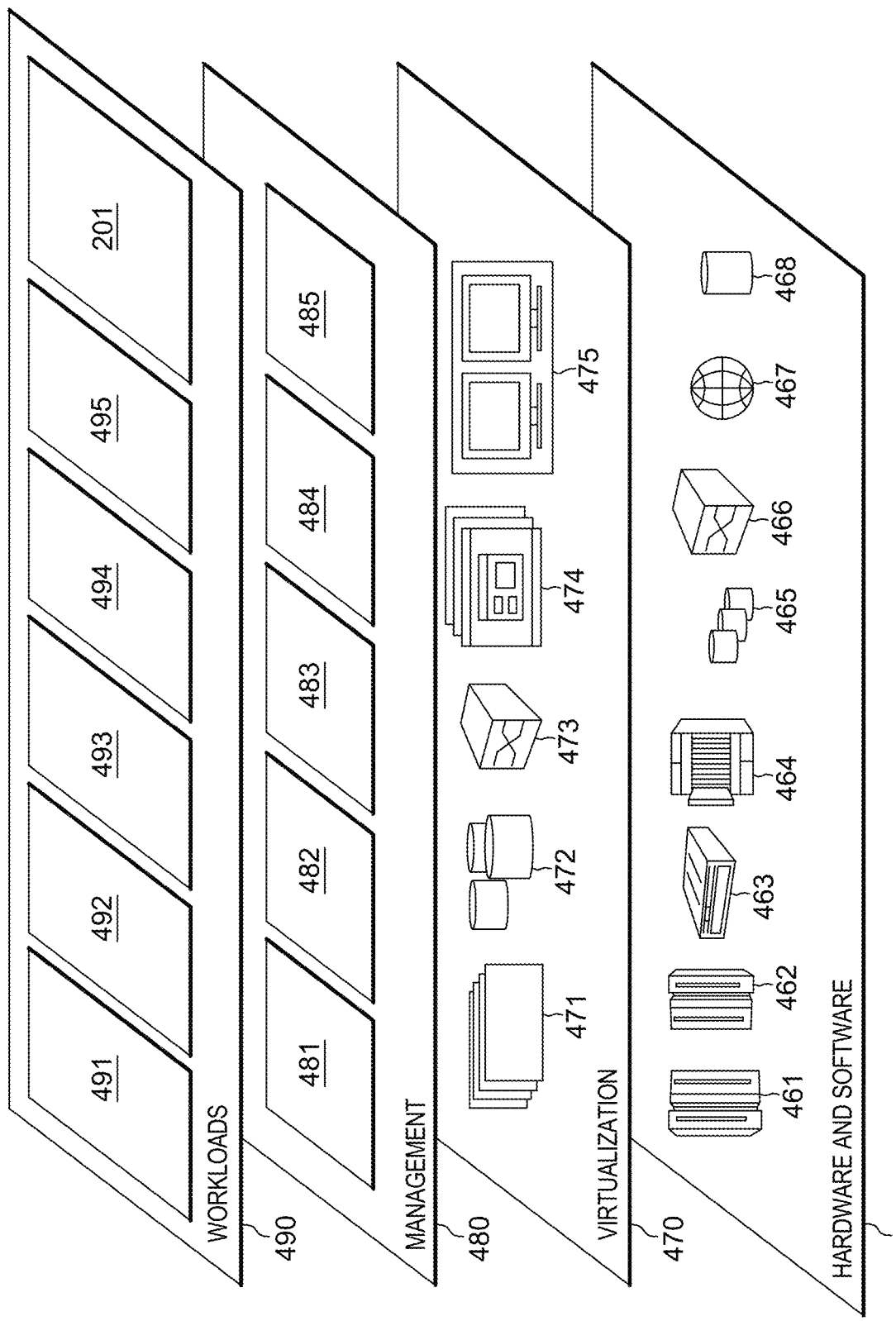
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

Management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include software development and lifecycle management 491, data analytics processing 492, multi-cloud management 493, transaction processing 494; database management 495 and an application UI 201 of one or more application(s) 203 placed in communication with a service mesh 211.

System for Dynamically Managing Application Log Levels in a Service Mesh

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 2A:
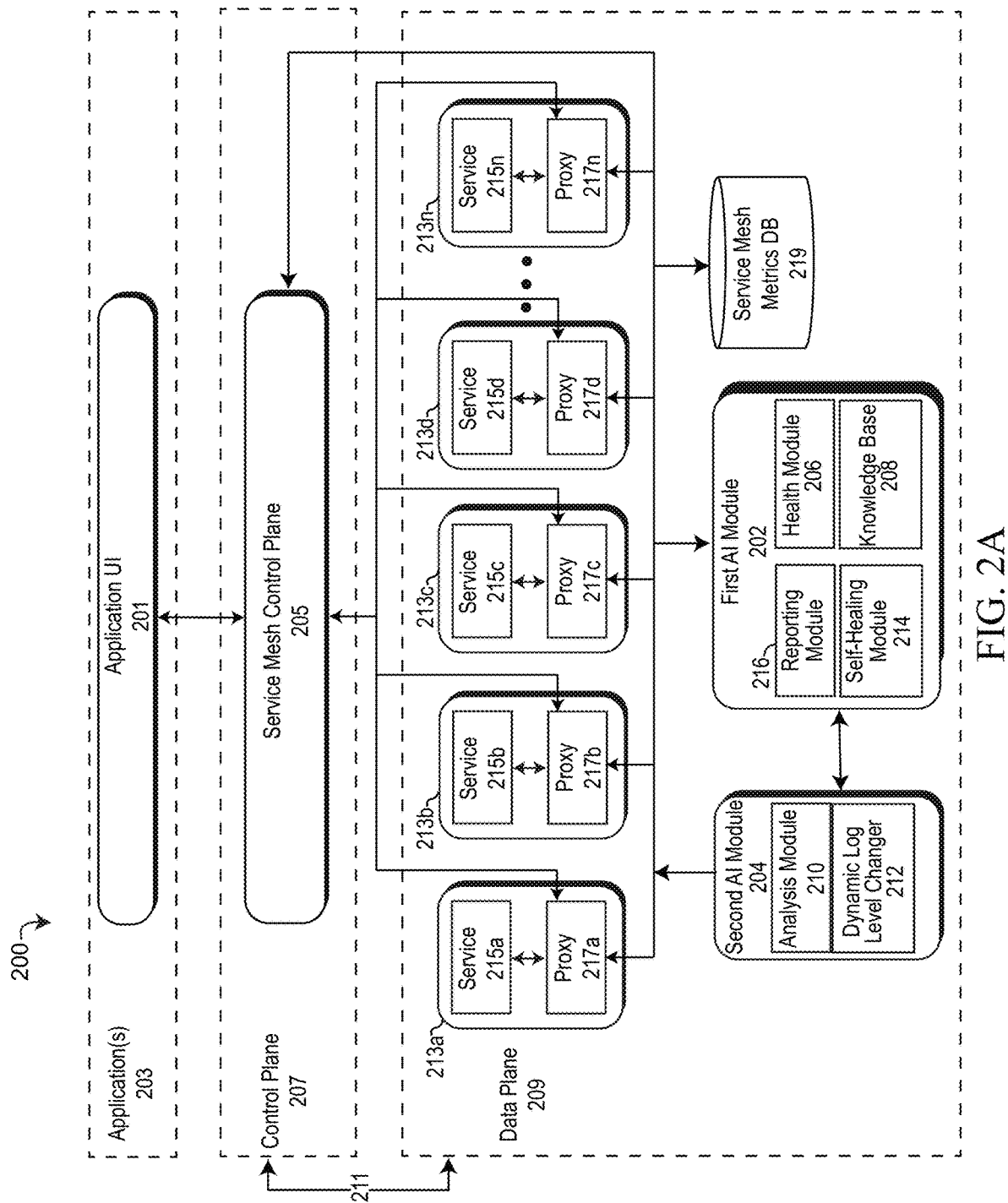
FIG. 2A depicts a functional block diagram describing an embodiment of a computing environment for implementing a service mesh capable of predicting errors in microservices of a microservice chain and dynamically managing log levels, in accordance with the present disclosure.

Referring to the drawings, FIG. 2A depicts an embodiment of a computing environment 200 illustrating a microservice architecture that can be executed on one or more computing systems 100 and variations thereof. As illustrated in the embodiment of the computing environment 200 depicted in FIG. 2A, a plurality of planes (or layers) of the environment 200 are placed in communication with one another. As depicted, the computing environment 200 includes (but is not limited to) an application plane or layer comprising one or more application(s) 203, a control plane 207 and a data plane 209.

Embodiments of the application layer may be the layer of the network comprising one or more application(s) 203 and/or services that may make requests for network functions from the control plane 207 and/or data plane 209. The combination of the control plane 207 and the data plane 209 make up the service mesh 211. Users accessing the applications 203 of the application layer may input the requests for services and/or functions of the network by interacting with a user interface (UI) of the application 203. For example, the application UI 201 shown in FIG. 2A. End user devices or client devices may request the services or functions from the planes of the service mesh 211 by inputting or transmitting one or more calls via the application UI 201 to the service mesh control plane 205 of the network and/or to one or more microservices 215a-215n (generally referred to herein as microservices 215 or services 215). Embodiments of the application UI 201 may be part a mobile application, web application, SaaS application, etc. For example, mobile applications may be inputting requests and routing data through the service mesh 211 by transmitting an API call to an API gateway of the network. In other examples, clients may be using a command line interface (CLI) to input commands to the service mesh 211 and/or a web-based UI transmitting an HTTP request via a web browser. Transaction requests to one or more microservices 215 of an application 203 may be initiated by external user(s) 261, and/or external services 263 incoming from outside of service mesh 211 network.

In some embodiments, the application 203 accessing and inputting commands into the computing environment 200 may be via a control plane UI being accessed by one or more administrators of the microservices 215. Administrators of the service mesh 211 may be able to obtain an overview of applications 203 running on the service mesh 211, including a view of applications running on each cluster, create or modify computing resources of the service mesh 211; deploy instances 213a-213n of services 215 which may be instantiated as part of a pod, container or cluster; scale service mesh 211 deployments; instances 213 of service 215; restart pods or containers and/or deploy new applications 203 or services 215.

Embodiments of the control plane 207 of the service mesh 211, may configure the data plane 209 based on a declared or desired state of the service mesh 211. The control plane 207 may be the portion or part of a network responsible for controlling how data packets are forwarded from a first location of the network 250 to a destination of the network 250, and the route the data will take to arrive at the destination. A control plane 207 may be responsible for creating a routing table, routing rules, and implementing various protocols to identify the network paths that may be used by the network 250. The control plane 207 can store the network paths to the routing table. Examples of protocols used for creating routing tables may include Border Gateway Protocol (BGP), Open Shortest Path First (OSPF), and/or Intermediate System to Intermediate System (IS-IS).

Embodiments of the service mesh control plane 205, may provide rules, policies and/or configurations enacted for each of the running data planes 209 of a service mesh 211. The service mesh control plane 205 may provide policies and configurations for all of the running data planes 209 in a service mesh 211 but does not touch any packets or requests transmitted by the external user(s) 261 or external service 263. Embodiments of the service mesh control plane 205 may turn all the data planes 209 into a distributed system. The service mesh 211 may be initially configured by a human administrator interacting with the service mesh control plane 205 via a UI to control the distributed system of the service mesh 211. For example, the administrator may interact with the service mesh control plane 205 through a web portal, CLI or some other interface. Through the UI, the operator or administrator may access global system configurations for the service mesh 211, including but not limited to, deployment control, authentication and authorization settings, route table specifications, initial application logging settings and load balancer settings such as timeouts, retries, circuit breakers, etc.

Embodiments of the service mesh control plane 205, may further include additional components that configure the service mesh 211. For example, in some embodiments, the service mesh control plane 205 may further configure a workload scheduler, service discovery and sidecar proxy configuration APIs. The services 215 of the service mesh 211 may run on infrastructure via a scheduling system (e.g., Kubernetes®), and the workload scheduler may be responsible for bootstrapping a service 215 along with a sidecar or proxy 217a-217n (referred to generally herein as proxy 217). As the workload scheduler starts and stops instances 213 of the services 215, the service discovery component may report the state of services 215 and may be the process responsible for automatically finding instances 213 of services 215 to fulfill queries and requests. Embodiments of sidecar proxy configuration APIs may describe the configuration of the proxy 217 mediating inbound and outbound communication to the service 215 attached to the proxy 217. During configuration of the proxies 217, all proxies 217 may be programmed in the service mesh 211 with configuration settings that allow the proxy to reach every instance 213 and/or service 215 in the service mesh 211. Moreover, the sidecar proxy configuration APIs may configure the proxy to accept traffic on all ports associated with a service 215. Furthermore, through the sidecar proxy configuration APIs, the service mesh control plane 205 may fine tune the set of ports, and protocols that a proxy 217 may accept when forwarding traffic to and from an instance 213 or service 215. Additionally, through the sidecar proxy configuration APIs, the service mesh control plane 205 may restrict a set of services 215 that a proxy 217 may reach when forwarding outbound traffic from a service 215 or instance 213.

Embodiments of the service mesh control plane 205 may organize instances 213 (such as one or more pods, containers or clusters), services 215, and/or proxies 217 into one or more networks or namespaces. The service mesh control plane 205 may enroll a set of namespaces to a service mesh 211 and upon enrolling a namespace, the service mesh control plane 205 may enable monitoring of resources within the namespace, including the monitoring of any applications deployed as pods, services 215 or other types of instances 213, and traffic policies. Enrolling a namespace also optionally allows for metrics to be collected for resources in the given namespace and for instances 213 of pods or services 215 within the namespace to be automatically injected with proxy 217 containers.

Referring now to the data plane 209, embodiments of the data plane 209 may be responsible for touching every packet of data and/or request of the service mesh 211. In other words, the data plane 209 of the service mesh 211 may be responsible for conditionally translating, forwarding, and observing every network packet that flows to and from the instances 213 of services 215 and/or proxies 217 within the service mesh 211. As illustrated in the exemplary embodiment, the data plane 209 may comprise a plurality of instances 213 such as one or more clusters, pods, or containers which may be hosting a service 215 within the instance 213. Embodiments of each service 215 may be co-located within an instance 213, with a sidecar network proxy 217. For example, as shown in FIG. 2A, service 215a is co-located with proxy 217a within instance 213a; service 215b is co-located with proxy 217b within instance 213b; service 215c is co-located with proxy 217c within instance 213c; service 215d is co-located with proxy 217d within instance 213*d*; and the last service 215*n* is co-located with proxy 217*n* within instance 213*n* of the data plane 209. All network traffic (e.g., HTTP, REST, gRPC, Redis, etc.) from individual services 215 may flow via the local proxy 217 to a destination routed by the service 215, in accordance with the routing rules and policies of the service mesh 211. Since the data flows from the services 215 to the co-located proxy 217 and a second proxy 217 to finally reach a second service 215, the services 215 may not be aware of the network of services at large that may form the data plane 209. Instead, the services 215 themselves may only be aware of their local proxy 217.

Embodiments of the proxies 217 may be responsible for performing tasks associated with service discovery, health checking, routing, load balancing, authentication/authorization, and observability. Service discovery tasks may include discovery of upstream and/or backend services 215 and instances 213 that are available on the data plane 209 of the service mesh 211. Health checking tasks may include determining whether upstream services 215 or instances 213 returned by service discovery are healthy and ready to accept network traffic. Health checking may include both active health checking and/or passive health checking. Health status of the services 215 and/or proxies 217 thereof may be reported to a health module 206 of a first AI module 202 (discussed in greater detail below). The health status of the services 215 and/or proxies 217 may, over time, be mapped by the health module 206. The mappings of the health status may be made for each individual microservice 215 of microservice chain(s), the error rates of the microservice chain(s) being invoked as a function of the API call, and the user profiles invoking the microservice chain(s) that are resulting in errors or failures.

Routing tasks of the proxies 217 may include directing requests to a proper instance 213, cluster, pod or container of a service 215. For example, a REST request for a local instance 213 of a service 215, a proxy 217 tasked with sending an outbound communication to the next service 215 of a microservice chain knows where to send the communication based on the routing rules and configurations. Authentication and authorization tasks of the proxy 217 may include the proxy 217 performing cryptographic attestation of incoming requests to determine if the request being invoked by a user is valid and allowable. For example, the user sending the requested call is authenticated the proxy 217 using Mutual Transport Layer Security (mTLS) or another mechanism of authentication, and if the user is allowed to invoke the requested endpoint service of the service mesh 211, the proxy 217 may route the request to the next service 215 along the microservice chain. Otherwise, the proxy 217 can return an unauthenticated response to an external user 261 or external service 263 indicating that it is not authorized to invoke a particular call function or a user that is not authenticated by the service mesh 211, and the failed authentication and/or error may be logged with the application 203 (depending on the current log level).

Embodiments of the proxies 217 may perform one or more observability tasks of the service mesh 211. The observability tasks may include, for each request, the collection of detailed metrics of the service mesh 211, including statistics, logging events and event details of the service mesh at an appropriate logging level, as set by a second AI module 204, and more specifically by the dynamic log level changer 212. Observability tasks may also include generation of distributed tracing data that may allow operators and administrators of the service mesh 211 to understand the distributed traffic flow of the service mesh 211. Embodiments of the service mesh 211 may keep track of all possible services 215 being invoked by users. Embodiments of the service mesh 211 may track the invoked services 215 on a per user basis and store the data associated with the user's invoked services 215 to profiles associated with the users (i.e., user profiles).

Over time, the service mesh 211 may build a heuristics database comprising historical metrics collected by the service mesh 211 via the proxy 217, as requested calls are made and fulfilled for users. Embodiments of the service mesh 211 can use the collected metrics to keep track of all possible microservice chains and API calls that are being used by the user profiles requesting transaction from the service mesh 211. The collected metrics provided by the heuristics database may be a source of information inputted into a knowledge base 208, that may be used as a basis to form predictions about the error rates of the application(s) 203, services 215 of the application(s) 203 and the microservice chains invoked by transactions being fulfilled by the service mesh 211. In the exemplary embodiment of FIGS. 2A and 2B, the heuristics database collecting metrics and providing the collected metrics to the knowledge base 208, may be referred to as service mesh metrics database 219 (referred to herein as service mesh metrics DB 219). Proxies 217 of the service mesh 211 may collect and store a plurality of different metrics to the service mesh metrics DB 219 over time, along with user profiles associated with the metrics being collected. For example, the types of metrics being collected by the service mesh 211 may include historical error rates of the individual microservices, historical error rates of microservice chains, the type of API call being made, operations carried out by the services 215, the number of retries to successfully complete an API call, the type of errors, warnings and failures that are occurring, time stamps, security events, etc.

Historical metrics collected from the proxies 217 and/or microservices 215 of the service mesh make it possible for the service mesh 211 to perform historical analysis of service mesh activities and transactions and predict which microservices 215 may be expected to take part in a transaction initiated by a specific API call to one or more of the microservices of the service mesh 211. The service mesh 211 via the service mesh control plane 205 may access and view current error rates of microservices 215, and microservice chains, as well as a historical view of the error rates collected by the service mesh metrics DB 219, success rate and failures of API calls, users associated with errors and failures occurring on the service mesh 211. Embodiments of the service mesh 211 may further be able to check the error rates of specific user profiles accessing particular microservice chains as well as the individual microservices 215 that may be accessed by users as part of the microservice chains being invoked, and the error rates that may historically occur.

Figure 2B:
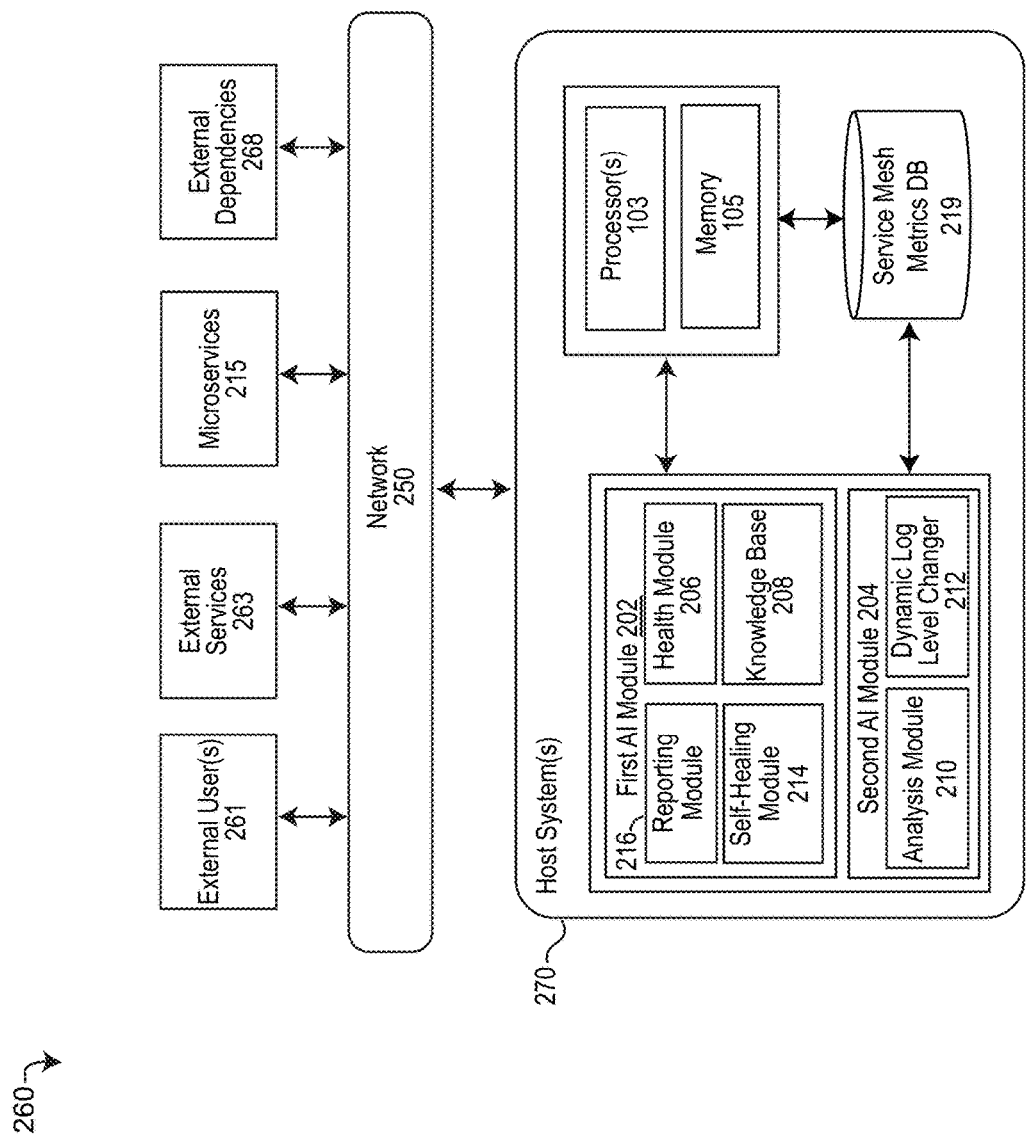
FIG. 2B depicts a functional block diagram describing an embodiment of a system for implementing a service mesh capable of predicting errors in microservices of a microservice chain and dynamically managing log levels, in accordance with the present disclosure.

Embodiments of the service mesh control plane 205 may deploy one or more AI systems to predict API call failures and/or adjust log levels of the application(s) 203. As shown in FIGS. 2A-2B AI modules 202, 204 may be capable of utilizing the current error rates of the service mesh 211, historical error rates of microservices and microservice chains, application logs and other transactional information collected by the service mesh 211 to predict the success or failures of incoming API calls and dynamically modify log levels of the microservices 215 (and/or proxies 217 thereof) based on error rate predictions. Embodiments of the service mesh control plane 205 may deploy a first AI module 202, and a second AI module 204 to the service mesh 211. The term "module" may refer to may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more specialized computing systems 100 operating as part of the computing environment 200. For instance, in the exemplary embodiment depicted in FIGS. 2A-2B, the first AI module 202 includes a plurality of components or modules, including (but not limited to) a health module 206, knowledge base 208, self-healing module 214 and reporting module 216. The second AI module 204 comprises components or modules, including (but not limited to) an analysis module 210 and a dynamic log level changer 212.

The health module 206 of the first AI module 202, may collect and track health status information from the proxies 217 engaged with health checking functions. The health module 206 may identify from the health status information microservices 215 that are live, running and active, as well as the microservices 215 that may have failed, gone offline or have become disabled, for example to due errors, updates or maintenance. Embodiments of the health module 206 may request health statuses from the proxies 217 or may initiate a health check directly by inputting a command, HTTP request or a transmission control protocol (TCP) probe. The health status of the microservice 215, proxy 217 and/or the instance 213 hosting the microservice 215 and/or proxy 217, such as a pod or container may provide information such as the name of the microservice, pod or container, the current status, a number of times the instance 213 has been restarted and the running time of the instance 213 and/or microservice 215. Embodiments of the health module 206 may perform the function of mapping the health status of individual microservices 215 to the historical error rates of microservice chains known for invoking the individual microservice. Embodiments of the health module 206 may output the mapping of the individual microservice's health statuses with microservice chain error rates to knowledge base 208 for further processing and predictions based on the mapping performed by the health module 206.

Embodiments of knowledge base 208 may perform the tasks and/or functions of the first AI module 202 associated with predicting error rates of a particular API call for each user profile and/or generally by the service mesh 211. The error rates may be predicted using a combination of historical error rates of microservice chains on a per user profile basis and/or historical error rates of individual microservices 215 of within the microservice chains along with the mapping of health status of the individual microservices to error rates of microservice chains of the service mesh 211. Embodiments of the knowledge base 208 may be a human-readable and/or machine-readable resource for disseminating and optimizing information collection, organization and retrieval for the service mesh 211 and/or the first AI module 202. The knowledge base 208 may draw upon the knowledge of humans and artificial intelligence, that has been inputted into the knowledge base 208 in a machine-readable form. For example, inputs from service mesh metrics DB 219 and the health module 206. Embodiments of the knowledge base 208 may be structured as a database and may be used to find solutions to current and future problems. For example, making predictions about API call failure rates for existing user profiles, new users and the service mesh 211 generally, using the data extracted from service mesh metrics DB 219 (including application logs) and the health status mappings provided by the health module 206.

Embodiments of the knowledge base 208 may not be simply a static collection of information. Rather, the knowledge base 208 may be a dynamic resource having the cognitive capacity for self-learning, using one or more data modeling techniques and/or by working in conjunction with a machine learning engine to improve upon the predictions of API call failure rates anticipated to occur within the microservices 215 and/or microservice chains of the service mesh 211. Embodiments of the knowledge base 208 may apply problem-solving logic and use one or more problem-solving methods to provide a justification for conclusions reached by the knowledge base 208 in order to arrive at a predicted error rate for an API call based on historical error rates of individual microservices of microservice chains, current error rates of the service mesh 211 and health status mappings of the microservices to the microservice chain error rates.

Exemplary embodiments of knowledge base 208 may be a machine-readable knowledge base 208 that may receive, and store data extracted from one or more data feeds collected by the service mesh metrics DB 219 and health module 206 being inputted into the knowledge base 208, along with any user feedback, or manually entered user adjustments, settings or parameters which may be stored as part of the knowledge base's knowledge corpus. A knowledge corpus may refer collections and/or the fragments of knowledge inputted into the knowledge base 208. Embodiments of the knowledge corpuses can be independent and uncoordinated from one another. For example, different knowledge corpuses collected from a plurality of separate and independent databases of metrics, and/or metrics collected from specific microservices 215, proxies 217, microservice chains, and user profiles wherein the knowledge base 208 may be compiling all of the knowledge corpuses, and may have an intentional ontological design for organizing, storing, retrieving and recalling the collection of knowledge provided by each knowledge corpuses. The historical compilation of datasets from one or more databases, microservices 215, proxies 217, microservice chains, user profiles, etc., along with user or service mesh administration feedback can be applied to making future predictions about the error rates of one or more API calls. Embodiments of the knowledge base 208 may perform automated deductive reasoning, utilize machine learning of machine learning engine(s) or a combination of processes thereof to make predictions about the API call error rates.

Embodiments of a knowledge base 208 may comprise a plurality of components implemented or executed to predict API call error rates, based on the records compiled by the knowledge base 208 from the service mesh 211 metrics, existing application logs, health information, user profiles, etc. Embodiments of the knowledge base 208 may include components (not shown) such as a facts database, rules engine, a reasoning engine, a justification mechanism, and a knowledge acquisition mechanism. The facts database may contain the knowledge base's current fact pattern of a particular situation, which may comprise historical and current data describing errors, failures and other events logged by the metrics collected by the service mesh metrics DB 219, as well as the health status mappings provided by the health module 206 and/or manual input or feedback provided by service mesh users and/or administrators.

Embodiments of the rules engine of knowledge base 208 may be a set of universally applicable rules that may be created based on the experience and knowledge of the practices of experts, developers, programmers and/or contributors to knowledge corpuses of the knowledge base 208. The rules created by the rules engine may be generally articulated in the form of if-then statements or in a format that may be converted to an if-then statement. The rules of knowledge base 208 may be fixed in such a manner that the rules may be relevant to all or nearly all situations covered by the knowledge base 208. While not all rules may be applicable to every situation being analyzed by the knowledge base 208, where a rule is applicable, the rule may be universally applicable.

Embodiments of the reasoning engine of knowledge base 208 may provide a machine-based line of reasoning for solving problems. The reasoning engine may process the facts in the fact database and the rules of the knowledge base 208. In some embodiments of the knowledge base 208, the reasoning engine may also include an inference engine which may take existing information stored by the knowledge base 208 and the fact database, then use both sets of information to reach one or more conclusions to predict the error rate of the API call generally and/or on a per user basis. Embodiments of the inference engine may derive new facts from the existing facts of the facts database using rules and principles of logic. For example, a microservice chain comprising four microservices 215 (M1 to M2 to M3 to M4) of the service mesh 211 is regularly invoked by a service mesh 211 to fulfill an API call. If the knowledge base 208 receives data from the service mesh 211 indicating that microservice M4 is observed to be failing 90% of the time over the last 24 hours when user 1 makes the API call, the reasoning engine of the knowledge base 208 may predict, based on the recent error rates of M4, that the API call has a high likelihood of error if user 1 invokes the microservice chain. Moreover, if the error rate of M4 has a similar error rate of 90% across all user profiles, an inference can be made by knowledge base 208, based on the high failure rate for the API call for all users, that new users trying to invoke the microservice chain using the same API call as existing users of the service mesh 211 experiencing 90% failure rates, may be predicted by the knowledge base 208 to also experience a similarly high failure rate.

Embodiments of the justification mechanism of the knowledge base 208 may explain and/or justify how a conclusion or prediction by knowledge base 208 was reached. The justification mechanism may describe the facts and rules that were used to reach the conclusion. Embodiments of the justification mechanism may be the result of processing the facts surrounding historical metrics and failures of the service mesh 211, including failures of specific microservice chains, and changes in the health status of individual microservices, in accordance with the record entries of the knowledge base 208, the application of facts to reasoning engine, the rules and the inferences drawn by the knowledge base 208.

In some embodiments, the knowledge base 208 may include a machine learning engine which may incorporate one or more machine learning techniques of a machine learning engine, either in conjunction with or as part of the knowledge base 208, to arrive at one or more predictions of API call error rates. In some embodiments the machine learning engine may be a separate component of the first AI module 202 than the knowledge base 208 and may receive inputs from the knowledge base 208 to build analytical or machine learning models used for predicting API call failure rates. The machine learning engine analyzes collected data sets from the service mesh 211 and may make predictions with a particular level of confidence. The better and/or more complete the data collected from the service mesh 211 (i.e., more detailed application logs, historical metrics, health status, etc.) the higher the level of confidence may be for the API call error rate predictions.

Embodiments of the machine learning engine of the first AI module 202 may use cognitive computing and/or machine learning techniques to identify patterns in the data compiled by the knowledge base 208, with minimal intervention by a human user and/or administrator(s) of the service mesh 211. Embodiments of the machine learning engine may use training methods such as supervised learning, unsupervised learning and/or semi-supervised learning techniques to analyze, understand and draw conclusions about the error rates of the microservices 215, microservice chains and individual user profiles making the API calls. Moreover, in some embodiments, the machine learning engine may also incorporate techniques of data mining, deep learning models, neural networking and data clustering to supplement and/or replace one or more of the machine learning techniques.

Supervised learning is a type of machine learning that may use one or more computer algorithms to train the machine learning engine of the first AI module 202 using labelled examples during a training phase. The term "labelled example" may refer to the fact that during the training phase, there are desired inputs that will produce a known desired output by the machine learning engine. For example, using historical data of API calls to predict microservices taking part in transactions of the same or similar type of API call, current error rates of microservice chains, historical error rates of individual microservices per user profile, and mappings of microservice health statuses over time, and other data logged by the microservices 215 and proxies 217 thereof, in order to teach the machine learning engine to be able to predict failure rates of future API calls. The algorithm of the machine learning engine may be trained by receiving a set of inputs along with the corresponding correct outputs. To employ supervised learning, the machine learning engine may store a labelled dataset for learning, a dataset for testing and a final dataset. During the training phase, the machine learning engine may learn the correct outputs by analyzing and describing well known data and information, that may be stored by the service mesh 211. For example, collected datasets from data feeds and/or historical data sets from historical data sources such as the service mesh metrics DB 219 and/or records of the knowledge base 208. The algorithm(s) of the machine learning engine may learn by comparing the actual output with the correct outputs in order to find errors. The machine learning engine may modify the machine learning models of data according to the correct outputs to refine decision making, improving the accuracy of the API failure rate predictions to provide the correct inputs. Examples of data modeling may include classification, regression, prediction and gradient boosting.

Unsupervised learning techniques may also be used by the machine learning engine of the first AI module 202 when there may be a lack of historical metrics that may be available to teach the machine learning engine using labelled examples of accurately predicted API call failures. Machine learning that is unsupervised may not be "told" the right answer the way supervised learning algorithms do. Instead, during unsupervised learning, the algorithm may explore the collected datasets from the service mesh metrics DB 219 and health module 206 to find the patterns and commonalities among the datasets being explored. Examples of unsupervised machine learning may include self-organizing maps, nearest-neighbor mapping, k-means clustering, and singular value decomposition.

Embodiments of machine learning engine may also incorporate semi-supervised learning techniques in some situations. Semi-supervised learning may be used for the same applications as supervised learning. However, instead of using entirely labelled training examples of data during the training phase, there may be a mix of labelled and unlabeled examples during the training phase. For example, there may be a small or limited amount of labelled data being used as examples alongside a larger amount of unlabeled data that may be presented to machine learning engine during the training phase. Suitable types of machine learning techniques that may use semi-supervised learning may include classification, regression and prediction models.

Embodiments of the first AI module 202, may further comprise a reporting module 216. The reporting module 216 may perform one or more functions and/or tasks associated with reporting predicted API call failures to a second AI module 204, and current log levels reported by the proxies 217. For example, when the reporting module 216 receives a predicted failure rate of an API call from the knowledge base 208, the reporting module 216 may send a notification to all the proxies 217 of the microservice mesh requesting the current log level setting of each proxy 217. The notification requesting a log level of the proxies 217 may be retrieved from proxies 217 before the API call is forwarded up the microservice chain. Upon receiving the current log levels from the proxies 217, the reporting module 216 may report the predicted API call failure rate and the current log levels retrieved from the proxies to the second AI module 204.

The log levels of an application 203, may be a piece of information indicating how important a log message may be, may be a way for distinguishing logged events from one another. Based on the current log level set with a proxy 217, the log level may act as a way to filter critical information about the state of the service mesh 211 from information that may be purely informative. By setting log levels, the amount of informational noise and alerts can be restricted when applications 203 and/or services 215 are working properly or allow more alerts and messaging when additional information is needed to improve predictions or solve the root causes of service failures. The log level hierarchy of logging frameworks may include the log levels of TRACE, DEBUG, INFO, WARN, ERROR and FATAL. TRACE may be the most fine-grained information and may be used in rare cases where full visibility of what is happening in an application 203 is needed and/or visibility inside the third-party libraries being used by the application 203. TRACE logging level can be very verbose and may be used for example to annotate each step in an application's algorithm or each individual query with parameters in the code. DEBUG is less granular compared to the TRACE level. The DEBUG log level may be used for information that may be needed for diagnosing issues and troubleshooting or when running application in the test environment for the purpose of making sure everything is running correctly. INFO may be considered the standard log level indicating that an event has occurred or the application 203 has entered a certain state. For example, a controller of an authorization API may include an INFO log level with information on which user requested authorization and if the authorization was successful or not. WARN is a log level that indicates that something unexpected happened in the application, a problem, or a situation that might disturb one of the processes, but not necessarily that the application failed 203. A WARN level may often be used in situations that are unexpected, but the code of the application 203 can continue to function. For example, a parsing error occurring that results in a document not being processed. ERROR is a log level that may be used when the application 203 hits an issue preventing one or more functionalities from properly functioning. For example, an ERROR log level can be used when one of the payment systems is not available, but there is still the option to check out the basket in the e-commerce application or when your social media logging option is not working for some reason. FATAL is the log level that indicates that the application 203 encountered an event or entered a state in which one or the crucial business functionalities is no longer working. For example, A FATAL log level may be used when the application is not able to connect to a crucial data store like a database or all the payment systems are not available, and users can't checkout their baskets in your e-commerce.

In some embodiments of the first AI module 202, the reporting module 216 may further communicate to the second AI module 204, whether or not the first AI module can recover from the anticipated failure without additional logging needed to be enabled or adjusted by the second AI module 204. For example, the reporting module may inform the second AI module 204 whether or not a self-healing module 214 of the first AI module 202 can recover from the predicted errors of one or more microservices 215 of a microservice chain. In situations where the errors predicted by the knowledge base 208 are anticipated to be recoverable by the self-healing module 214 without additional details to be collected by application logs in order to fix the root cause of the errors, the reporting module 216 may indicate that self-healing is available. The inclusion of the indication that predicted errors are recoverable (or have recovered) via the self-healing module 214, by the reporting module 216, may signal to the second AI module 204 that adjustments to log levels and/or additional application logging or analysis of current log levels is unnecessary for the API call. For example, the self-healing module 214 may attempt to retry API call failures up to a configurable number of retries (i.e., N retries, where N is a configurable integer representing the maximum number of times to retry the failed API call). Failures recovered within the configured number of retries may be considered self-healing and the reporting module 216 may indicate that additional analysis or change to the log levels is not needed by the second AI module 204. However, in situations wherein the self-healing module 214 cannot recover from API call failures above a configured threshold number of times, a reporting module 216 may trigger the second AI module 204 to analyze current log levels and dynamically change log levels as needed to collect additional application information to correct the failed API call from re-occurring and/or improving predictions whether the same API call can be recovered by the self-healing module 214.

Embodiments of the second AI module 204 may comprise an analysis module 210. The analysis module 210 may receive the output from the first AI module 202 and determine whether or not to dynamically enable additional logging in the application 203 and/or implement log level changes to the services 215 and/or proxies 217 of the service mesh 211. For example, output from the first AI module 202 may include output from reporting module 216, including predicted API call failure rates, the confidence level of the API call failure rate predictions, the predicted failure of specific microservices 215 or microservice chain(s) of the application 203, the type of failures expected to occur, whether the failures of the application 203 can be recovered by the self-healing module 214 and/or the current log levels reported by the proxies 217 of the service mesh 211. Using the output from the first AI module 202 as input into the analysis module 210, the second AI module 204 may conclude whether or not the logging levels of the microservices 215 and/or proxies thereof should be changed to collect more or less application information during runtime, and which microservices 215 and/or microservice chains should have the logging levels modified via the dynamic log level changer 212.

With regard to the analysis module 210 concluding whether or not to modify current logging levels of the services 215 and/or proxies 217 of the application 203, the analysis module 210 may first consider whether or not the predictions about the API call failure rate by the first AI module 202 are within a threshold level of confidence. For example, when the analysis module 202 is examining the confidence level of the API failure rate predictions, the analysis module may have a minimal level of confidence that should be achieved by the first AI module's predictions, otherwise, logging levels may be adjusted to improve application logs, provide additional details as part of the corpus of the knowledge base 208 and improve the confidence levels of the predictions put forth by the knowledge base 208. For example, the analysis module may require that the minimal confidence level of the predictions being received to be above 85%, 90%, 95%, 98%, etc., and where the confidence levels of the predictions fall below the 98%, 95%, 90%, 85% or any other threshold set by the second AI module 204 and/or administrator of the second AI module 204, then the analysis module 210 may deploy the dynamic log level changer 212 to adjust the log levels of services 215, proxies 217 or instances hosting services 215, such as the log levels of clusters, pods, or containers.

Embodiments of the analysis module 210 may secondly consider whether the predicted error rate of the first AI module 202 is a sufficient error rate for the current log level where predictions of API call failures predicted by the first AI module 202 are predicted above a threshold confidence level. The analysis module 210 may examine and consider the predicted failure rate along with the current log levels as reported by the proxies 217. Analysis module 210 may analyze whether the current log level as reported by the proxies 217 is sufficient for the predicted failure rate, and where the log level is not sufficient for predicted failure rate, the analysis module 210 may instruct the dynamic log level changer 212 to change the logging level of the proxies 217 to capture additional information and details in the application logs. The correlation between failure rate and sufficiency of the logging level may be set by an administrator of the service mesh 211 in some embodiments or a developer of the application 203. In other embodiments, users may be able to write their own logic that would trigger dynamic changes to the log levels based on predicted failure rates and the current log level.

In some embodiments, the analysis module 210 may instruct the dynamic log level changer 212 to reduce the log levels of the service mesh 211. For example, upon analysis of the first AI module's 202 predictions that are above a threshold level of confidence, the analysis module 210 finds that the API failure rate is negligible, non-existent or below a threshold failure rate upon which the analysis module 210 may consider the application 203 to be stable, the analysis module 210 may instruct the dynamic log level changer 212 to reduce the logging level of the microservices 215 and/or proxies 217 thereof, reducing the amount of information collected by the application logs. In some instances, wherein the dynamic log level changer 212 has previously adjusted the log level of the microservices 215 and/or proxies 217 in a manner that increased the amount of information logged, the log level may be subsequently reduced, adjusted in a manner that collects less information in the application logs and/or returns the log level to a default level upon reaching a threshold period of time without additional API call failures occurring. For example, in a situation where a log level was increased from INFO to DEBUG in view of predicted failures rates, and a threshold period of time is set to 48 hours, after 48 hours without an API call failure occurring, the service mesh 211 may have the dynamic log level changer 212 reduce the log level from DEBUG back to the previous log level INFO.

Embodiments of analysis module 210 predictively target specific microservices 215 and/or proxies 217 log levels dynamically increased or decreased based on similarities to other microservice chains being analyzed for predicted failures. Using FIG. 2B as an example, a host system 270 of the service mesh 211 receiving an API call from an external user(s) 261 and/or external services 263 is shown in computing environment 260. The first AI module 202 can predict which microservices 215 and microservice chains are expected to fail based on historical error rates, current error rates and health mappings of the microservices 215 to the microservice chain errors. The analysis module 210 can use the predictions of the first AI module 202 and logically apply changes to other similar microservice chains and specifically target microservices and microservice chains to apply an increased log level. For instance, the host system 270 may detect issues with common external dependencies 268 and change log levels accordingly for all microservice chains that may rely on the same external dependency causing failures. For example, a microservice chain comprising microservices M1 to M2 to M3 may be used in response to an API call, and the knowledge base 208 has predicted a high failure rate due to M3 using failing external dependency such as a failing cloudant URL. The analysis module 210 can instruct the dynamic log level changer 212 to increase the log level for each of the microservices 215 (M1, M2 and M3) in anticipation of the predicted failure. Moreover, if another microservice chain, such as a microservice chain M4, to M5 to M6 uses the same cloudant URL for a similar API call, the analysis module 210 may further instruct the dynamic log level changer 212 to increase the log levels on microservices M4, M5 and M6 as well.

In another example of predictively modifying log levels for similar microservices 215 and microservice chains, the analysis module 210 may modify logging levels that may be predicted to fail for all microservices 215 that may be running similar builds of an instance 213, such as a similar build of a container or pod. For example, the service mesh 211 may be detecting security issues on certain instances 213 having the same or similar build. For instance, a microservice chain M1 to M2 to M3 may be detected as failing due to intrusion detected at M3 on a NGINX container of a specified version. A different microservice chain M4 to M5 to M6 may be using the same NGINX container and thus an API call invoking the M4, M5, M6 microservice chain may be predicted to fail in a similar manner as the M1, M2, M3 microservice chain. In response, the analysis module 210 may instruct the dynamic log level changer 212 to apply changes the logging levels for all similar microservice chains, including the M1, M2, M3 chain and the M4, M5, M6 chain which are using the same type of container and builds with the detected security issues and thus predicted to fail.

Figure 5:
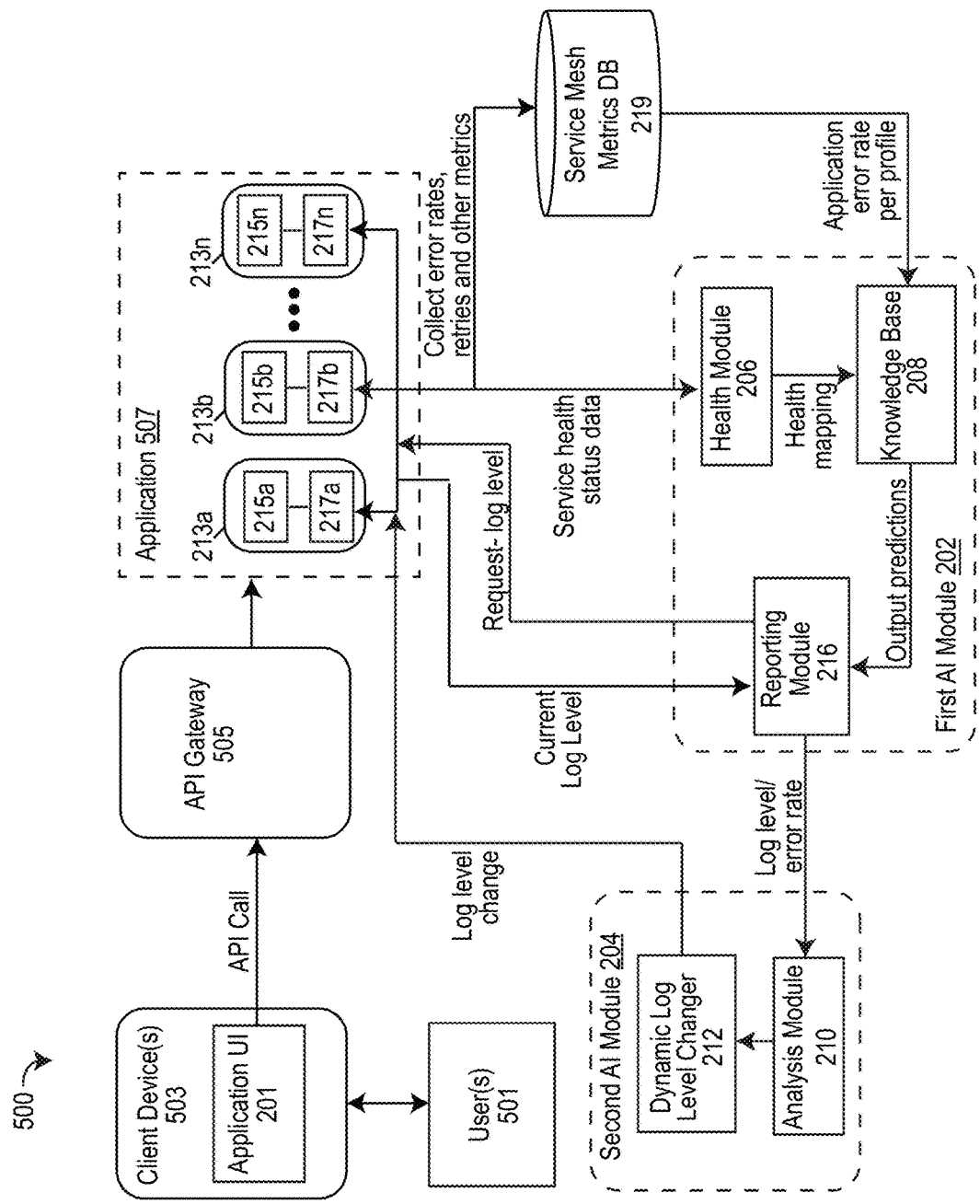
FIG. 5 depicts a block diagram illustrating an embodiment of a service mesh dynamically adjusting log levels of a microservice chain in accordance with the present disclosure.

Referring to the drawings, FIG. 5 illustrates an example flowchart 500 describing dynamic management of application log levels in response to predicted API call failure. As shown in FIG. 5, the environment includes a mature service mesh metrics DB 219 which comprises service mesh metrics including historical error rates, retry rates, security issues, events logged by application logs and additional historical information collected from past API calls invoking microservice chains of the service mesh 211. Moreover, the environment depicted in FIG. 5 may also include a trained knowledge base 208 comprising an existing corpus of knowledge built from knowledge sources such as the service mesh metrics DB 219 and the health module 206. As shown in FIG. 5, one or more user(s) 501 instructs a client device 503 via an application UI 201 to submit an API call to application 507. The API call is sent via an API gateway 505. When the API call for microservices 215 lands on the service mesh 211, before forwarding the API call up the invoked microservice chain, the service mesh 211 may check the predicted error rate of the API call based on the service mesh metrics collected by the service mesh metrics DB 219 and the health status data of the service mesh mapping microservices 215 historically taking part in transactions of the API call (or similar API calls) to the microservice chain error rate, by health module 206. Predicted API call failure rate is output from the knowledge base to a reporting module 216 which may request current log levels from the proxies 217 of the service mesh 211. Reporting module 216 may report the predicted API call failure rate, along with confidence levels of the prediction, current log levels as reported by the proxies, as well as additional information such as the type of failures in the application 507 and whether or not self-healing is possible. Based on the data received from the reporting module 216, the analysis module 210 instructs dynamic log level changer to increase, decrease, or retain the current log levels of the services 215. and/or proxies 217 thereof.

Method for Dynamically Managing Application Log Levels in a Service Mesh

Figure 6A:
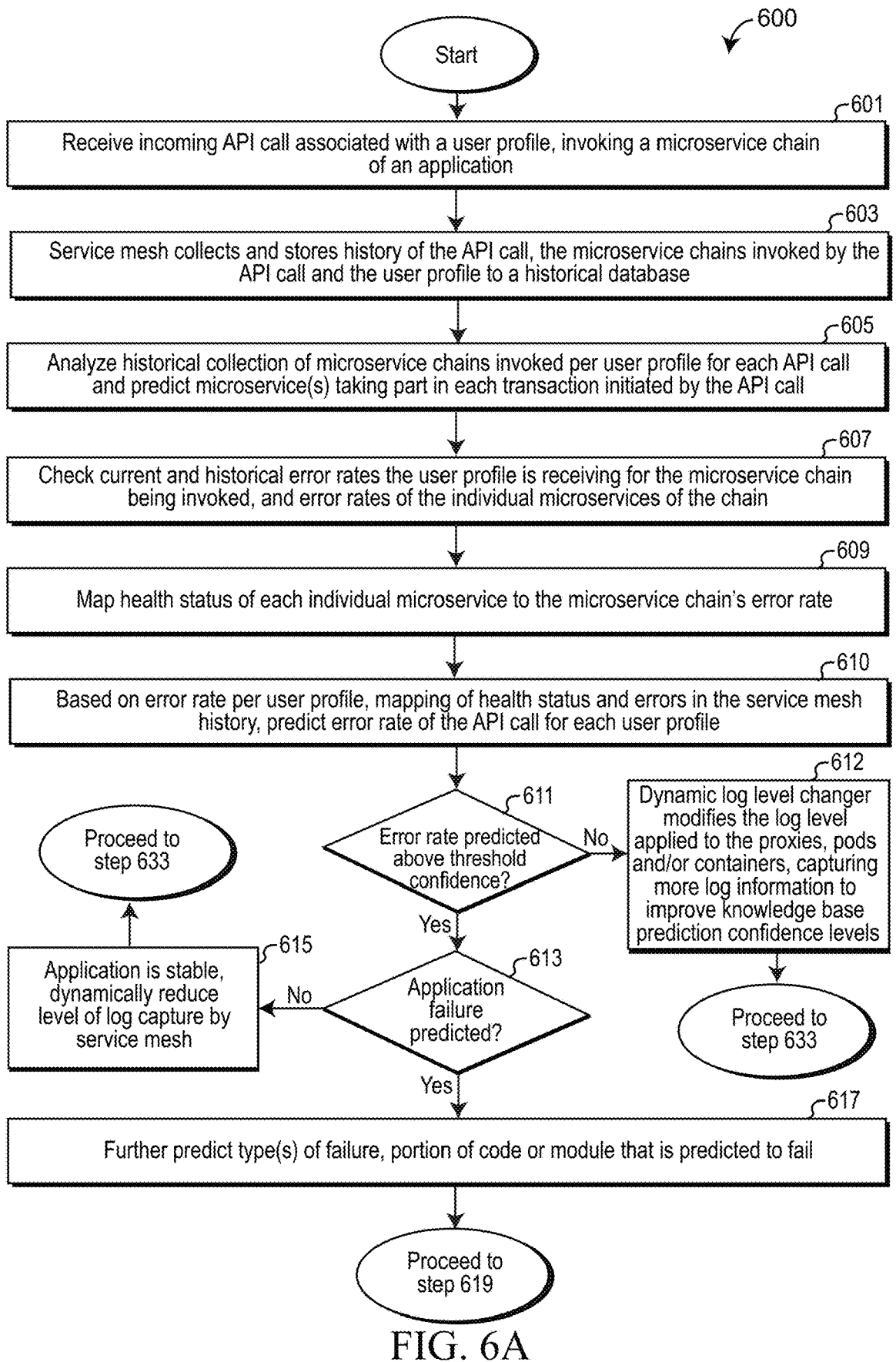
FIG. 6A depicts a flow diagram describing an embodiment of a method for dynamically adjusting log levels of a microservice chain of a service mesh in accordance with the present disclosure.
Figure 6B:
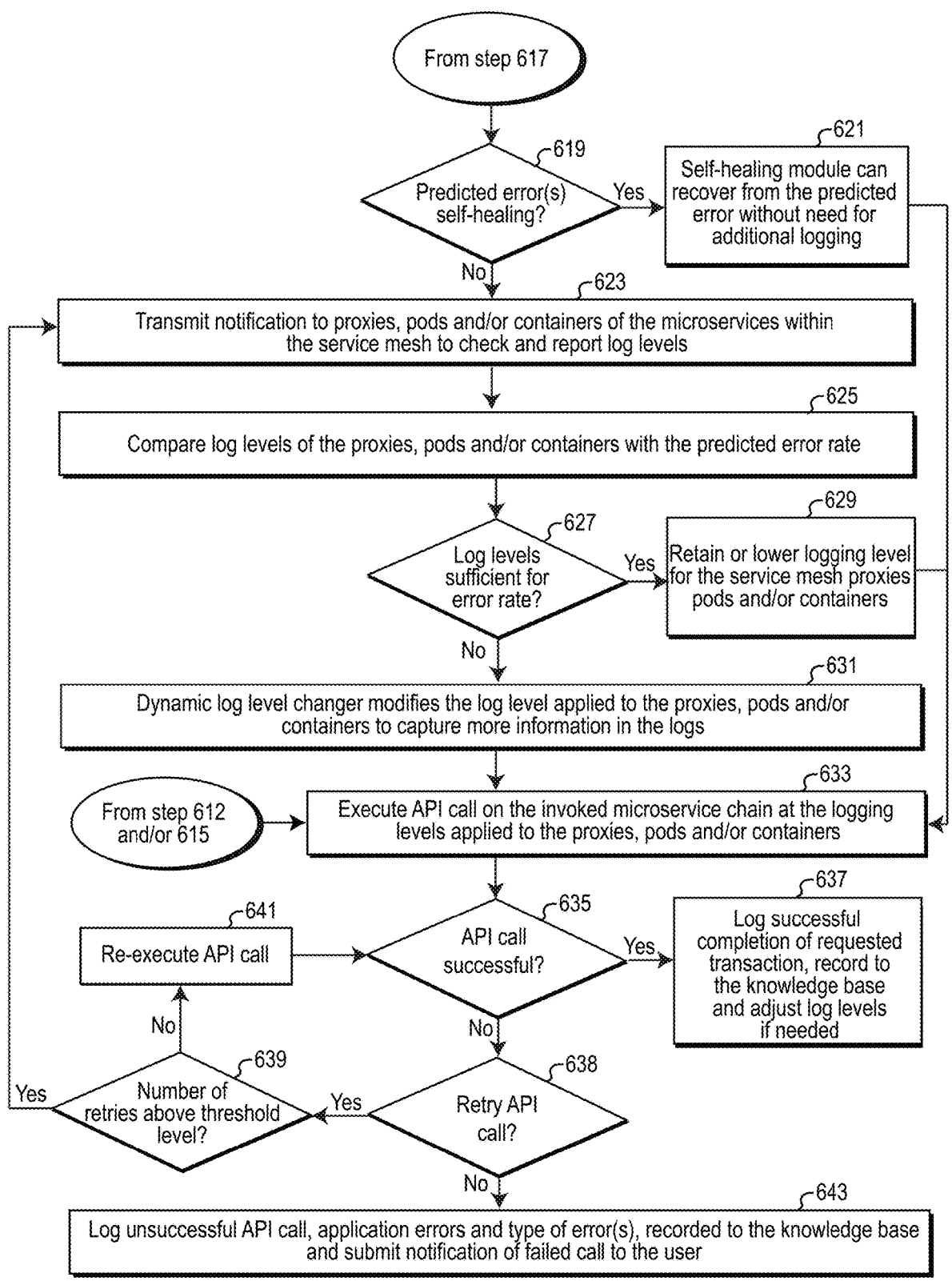
FIG. 6B is a continuation of the flow diagram of FIG. 6A, describing the embodiment of the method for dynamically adjusting log levels of a microservice chain of a service mesh.

The drawings of FIGS. 6A-6B represent embodiments of methods for implementing a service mesh 211 capable of dynamically managing application log levels, as described in accordance with FIGS. 2-5 above, using one or more computing systems defined generically by computing system 100 of FIGS. 1A-1B; and more specifically by the embodiments of specialized computer systems depicted in FIGS. 2-5 and as described herein. A person skilled in the art should recognize that the steps of the method described in FIGS. 6A-6B may be performed in a different order than presented and may not require all the steps described herein to be performed.

The embodiment of method 600 described by FIGS. 6A-6B for dynamically managing application log levels within a service mesh 211 may begin at step 601. During step 601, an API call transmitted by a user of an application 203 may be received by the service mesh 211. The API call may be associated with a user profile of the user making the API call and invoke a microservice chain of the application 203 comprising one or more services 215 that make up the microservice chain. In step 603, the service mesh collects and stores the history of the API call being made, the microservice chains invoked by the API call and the user profile making the API call to a historical database. In step 605, the historical collection of microservice chains invoked per user profile for each API call are analyzed by a knowledge base 208 of a first AI module 202. Based on the type of API call and the historical data describing the microservice chains historically invoked by the type of API call being made in step 601, the knowledge base 208 of the first AI module 202 may predict the microservice(s) taking part in each transaction initiated by the API call.

In step 607, knowledge base 208 checks and analyzes the current error rates and historical error rates for the microservice chain being invoked for the user profile as well as the error rates of the individual microservices of the chain. In step 609, the health status of each individual microservice 215 in the microservice chain is mapped to the microservice chain's error rate by the health module 206. In step 610, based on the error rate for the user profile submitting the API call, mapping of the health status of the individual microservices 215, and historical errors in the service mesh history, the knowledge base 208 predicts the error rate of the API call for the user profile invoking the API call. The predicted error rate outputted by the knowledge base 208 is reported to the second AI module 204, for example via reporting module 216.

In step 611, upon analysis of the error rate predicted by the first AI module 202, a determination is made by the analysis module 210 of the second AI module 204, whether or not the predicted error rate was made by the first AI module 202 with a level of confidence above a threshold level established by the application 203 and/or service mesh 211. If the error rate prediction made by the first AI module 202 is not considered to be above a threshold level of confidence by the second AI module 204, the method 600 may proceed to step 612 whereby in step 612 the dynamic log level changer 212 may modify the log level applied to the proxies 217, and/or instances 213 deployed by the service mesh 211, including at the pod level or container level hosting the service 215. In situations where the second AI module 204 determines a lower confidence level below the threshold level of confidence, the dynamic log level changer 212 may increase the log level, capturing more log information collected by the services 215 and/or proxies 217 of the applications 203. The increased log level applied to the services 215, proxies 217 and/or instances 213 thereof, may improve the overall confidence of the predictions being made by the first AI module 202 by increasing the amount of information stored by service mesh metrics DB 219 and thus accessible to the knowledge base 208 when making predictions about the error rate. Improving accuracy of the knowledge base's 208 API call failure rate predictions.

Conversely, in step 611, if a determination is made by the second AI module 204 that the predicted error rate by the first AI module 202 is above a threshold level of confidence, the method 600 may proceed to step 613. In step 613, the second AI module 204 may further determine whether the API call being invoked on the service mesh 211 is being predicted to fail at all or at a negligible rate of failure by the first AI module 202. If the first AI module 202 is not predicting the API call to fail at one or more of the services 215 of the microservice chain (or the rate of failure is considered miniscule), the method may proceed to step 615, wherein the application 203 may be considered stable. The dynamic log level changer 212 may maintain the current log level of the services 215, proxies 217, pods or containers thereof or reduce the log level, resulting in a reduction to the level of log capture by the service mesh 211. Moreover, if in step 613 a determination is made that API call failure is predicted by the first AI module 202, in step 617 the first AI module 202 may further predict and report to the second AI module 204, the type of failure predicted to occur, the portion of the code or module predicted to fail and whether or not the errors predicted to cause the application failure are expected to be self-healing.

In step 619, if the first AI module 202 provides to the second AI module 204 an indication that the predicted error(s) of the application 203 are self-healing, the method 600 may proceed to 621, whereby the self-healing module 214 of the first AI module 202 indicates that the service mesh 211 can recover from the predicted errors without needing to enable additional logging by the instances 213, services 215 or proxies 217 of the service mesh 211. Likewise, if the API call failures predicted by the first AI module 202 are not considered self-healing by the self-healing module 214, the method 600 may proceed to step 623. During step 623, a reporting module 216 of the first AI module 202 may transmit a notification to the pods, containers, or proxies 217 of the microservices 215 within the service mesh requesting the proxies 217, pods and/or containers hosting the microservices check the current log levels and report back the log levels to the first AI module 202.

In step 625 of method 600, the reporting module 216 may report the current log levels of the service mesh 211 as provided by the proxies 217, pods and/or containers to the second AI module 204. The second AI module 204 may compare the current log levels being reported with the error rate of the API call predicted by the first AI module 202. In step 627, a determination is made by the second AI module 204 whether the current log levels are sufficient for the predicted error rate of the API call. If in step 627 log levels are sufficient for the predicted error rate, the method may proceed to step 629. In step 629, the dynamic log level changer 212 of the second AI module 204 may retain the log level for the service mesh 211 at the current log levels or in some instances may lower the log level further, reducing the amount of information being captured in the logs of the proxies 217, pods and/or containers of the service mesh. Conversely, if in step 627 the log levels are found to not be sufficient for the API call error rate predicted by the first AI module 202, the method 600 may proceed to step 631.

In step 631, in response to the log levels being considered insufficient for the predicted API call error rate, the dynamic log level changer 212 of the second AI module 204 may modify the log levels of the service mesh 211. More specifically, the dynamic log level changer 212 may increase the log level being applied to the proxies 217, pods and/or containers, increasing the amount of information being captured in the logs of the application 203 invoking the service chain(s). Upon a successful increase of the log levels in step 631, in step 633, the API call is executed by the service mesh 211 via the invoked microservice chain at the logging levels applied to the proxies, pods and/or containers by dynamic log level changer of the second AI module 204.

In step 635, the service mesh 211 ascertains whether or not the API call is successful. If the API call is successful, then in step 637 the successful completion of the successful transaction is logged to the service mesh metrics DB 219 by the service mesh 211 and inputted into the records of the knowledge base 208. Over time, where the same API call is successful above a threshold amount of time as configured by the service mesh 211, the dynamic log level changer 212 of the second AI module 204 may further adjust the log levels of the proxies 217, pods and/or containers of the service mesh. For example, by lowering the log levels where the same API call is consistently successful over the configured threshold amount of time. Moreover, where the success of the API call occurs after one or more attempts to retry the execution of the API call, the service mesh 211 may not adjust the log levels of the proxies, pods and/or containers of the service mesh 211 in instances where the number of retries is below a configured number of retries.

If on the other hand, the API call is determined to not be successful in step 635, the method 600 may proceed to step 638, wherein a determination is made whether or not to retry the unsuccessful API call. If the unsuccessful API call is not retried, in step 643 the failure to complete the API call is logged by the service mesh 211 in the service mesh metrics DB 219, inputted into the records of the knowledge base 208 and a notification of the failed API call may be transmitted and/or displayed back to the application UI 201, informing the user of the application 203 of the API call failure. Conversely, where the API call is determined to be retried in step 638, the method 600 may proceed to step 639 wherein the second AI module 204 may further determine whether a number of retries by the service mesh 211 to complete the API call is above a threshold number of retries. If a threshold number of retries has not been reached, the method 600 may proceed to step 641, wherein the service mesh 211 re-executes the API call. In contrast, where in step 639 a determination is made that the number of retries to execute the API call exceeds a threshold number of retries triggering the method 600 return to step 623, wherein first AI module 202 transmits a notification to the proxies, pods and/or containers of the service mesh 211 to check and report current log levels.

What is claimed is:

1. A computer-implemented method for dynamically managing log levels of applications within a service mesh, the computer-implemented method comprising:
   receiving, by the service mesh, an API call associated with a user profile initiating a transaction to use one or more microservices of the service mesh;
   analyzing, by the service mesh, historical metrics provided by the microservices of the service mesh;
   predicting, by the service mesh, the one or more microservices taking part in the transaction initiated by the API call based on the historical metrics;
   checking, by the service mesh, error rates the user profile historically receives for initiating the API call using specific microservice chains of the service mesh and error rates for individual microservices of the specific microservice chains historically initiated by the API call;
   mapping, by the service mesh, a health status for the individual microservices of the specific microservice chains historically initiated by the API call to the error rates for the specific microservice chains;
   predicting, by the service mesh, an error rate for the API call for the user profile based on the error rates the user profile historically receives for initiating the API call, the mapping of the health status and historical error rates of the service mesh; and
   retrieving, by the service mesh, a current log level from each of the individual microservices, and upon the current log level of one or more of the individual microservices being below a threshold log level for the error rate of the API call initiated by the user profile, dynamically changing, by the service mesh, the current log level for one or more of the individual microservices to a new log level, increasing an amount of information captured by logs of the one or more of the individual microservices.

2. The computer-implemented method of claim 1, further comprising:
   transmitting, by the service mesh, a notification to proxies of the individual microservices to check and report the current log levels and report the log levels; and
   comparing, by the service mesh, the current log level to the error rate for the API call.

3. The computer-implemented method of claim 2, wherein upon comparing the current log level to the error rate for the API call, the current log level of one or more of the individual microservices is above the threshold log level for the error rate of the API call, retaining or lowering, by the service mesh, the current log level of the individual microservices; and
   executing, by the service mesh, the API call at the current log level or a reduced log level applied to one or more of the individual microservices.

4. The computer-implemented method of claim 1, wherein dynamically changing, by the service mesh, the current log level for one or more of the individual microservices to increase an amount of information captured by the logs includes dynamically changing log levels of containers or pods hosting the one or more individual microservices.

5. The computer-implemented method of claim 1 further comprising:
   executing, by the service mesh, the API call, and the API call fails;
   checking, by the service mesh, a number of times the service mesh has retried to execute a failed API call;
   upon checking the number of times, the service mesh has retried to execute the failed API call, the number of times is above a threshold number of retries, transmitting, by the service mesh, a notification to proxies of the individual microservices to check and report the current log levels; and
   in response to the number of times being above the threshold level, dynamically changing, by the service mesh, the current log level for one or more of the individual microservices to increase an amount of information captured by the logs.

6. The computer-implemented method of claim 5, whereupon in response to the number of times being below the threshold level of retries, the service mesh re-executes the API call; and
   upon re-execution of the API call, the API call successfully recovers and completes the transaction within the threshold number of retries, the service mesh maintains the current log levels of the one or more individual microservices.

7. The computer-implemented method of claim 1, further comprising:
   reducing, by the service mesh, the new log level back to a previous log level upon a plurality of API calls successfully completing without errors for a threshold period of time at the new log level.

8. A computing program product for dynamically managing log levels of applications within a service mesh comprising:
   one or more computer readable storage media having computer-readable program instructions stored on the one or more computer readable storage media, said program instructions executes a computer-implemented method comprising:
      receiving, by the service mesh, an API call associated with a user profile initiating a transaction to use one or more microservices of the service mesh;
      analyzing, by the service mesh, historical metrics provided by the microservices of the service mesh;
      predicting, by the service mesh, the one or more microservices taking part in the transaction initiated by the API call based on the historical metrics;
      checking, by the service mesh, error rates the user profile historically receives for initiating the API call using specific microservice chains of the service mesh and error rates for individual microservices of the specific microservice chains historically initiated by the API call;
      mapping, by the service mesh, a health status for the individual microservices of the specific microservice chains historically initiated by the API call to the error rates for the specific microservice chains;
      predicting, by the service mesh, an error rate for the API call for the user profile based on the error rates the user profile historically receives for initiating the API call, the mapping of the health status and historical error rates of the service mesh; and
      retrieving, by the service mesh, a current log level from each of the individual microservices, and upon the current log level of one or more of the individual microservices being below a threshold log level for the error rate of the API call initiated by the user profile, dynamically changing, by the service mesh, the current log level for one or more of the individual microservices to a new log level, increasing an amount of information captured by logs of the one or more of the individual microservices.

9. The computing program product of claim 8, further comprising:
   transmitting, by the service mesh, a notification to proxies of the individual microservices to check and report the current log levels and report the log levels; and
   comparing, by the service mesh, the current log level to the error rate for the API call.

10. The computing program product of claim 9, wherein upon comparing the current log level to the error rate for the API call, the current log level of one or more of the individual microservices is above the threshold log level for the error rate of the API call, retaining or lowering, by the service mesh, the current log level of the individual microservices; and
   executing, by the service mesh, the API call at the current log level or a reduced log level applied to one or more of the individual microservices.

11. The computing program product of claim 8, wherein dynamically changing, by the service mesh, the current log level for one or more of the individual microservices to increase an amount of information captured by the logs includes dynamically changing log levels of containers or pods hosting the one or more individual microservices.

12. The computing program product of claim 8, further comprising:
   executing, by the service mesh, the API call, and the API call fails;
   checking, by the service mesh, a number of times the service mesh has retried to execute a failed API call;
   upon checking the number of times, the service mesh has retried to execute the failed API call, the number of times is above a threshold number of retries, transmitting, by the service mesh, a notification to proxies of the individual microservices to check and report the current log levels; and
   in response to the number of times being above the threshold level, dynamically changing, by the service mesh, the current log level for one or more of the individual microservices to increase an amount of information captured by the logs.

13. The computing program product of claim 8, further comprising:
reducing, by the service mesh, the new log level back to a previous log level upon a plurality of API calls successfully completing without errors for a threshold period of time at the new log level.

14. A computer system for dynamically managing log levels of applications within a service mesh comprising:
a processor; and
a computer-readable storage media coupled to the processor, wherein the computer-readable storage media contains program instructions executing, via the processor, a computer-implemented method comprising:
receiving, by the service mesh, an API call associated with a user profile initiating a transaction to use one or more microservices of the service mesh;
analyzing, by the service mesh, historical metrics provided by the microservices of the service mesh;
predicting, by the service mesh, the one or more microservices taking part in the transaction initiated by the API call based on the historical metrics;
checking, by the service mesh, error rates the user profile historically receives for initiating the API call using specific microservice chains of the service mesh and error rates for individual microservices of the specific microservice chains historically initiated by the API call;
mapping, by the service mesh, a health status for the individual microservices of the specific microservice chains historically initiated by the API call to the error rates for the specific microservice chains;
predicting, by the service mesh, an error rate for the API call for the user profile based on the error rates the user profile historically receives for initiating the API call, the mapping of the health status and historical error rates of the service mesh; and
retrieving, by the service mesh, a current log level from each of the individual microservices, and upon the current log level of one or more of the individual microservices being below a threshold log level for the error rate of the API call initiated by the user profile, dynamically changing, by the service mesh, the current log level for one or more of the individual microservices to a new log level, increasing an amount of information captured by logs of the one or more of the individual microservices.

15. The computer system of claim 14, further comprising:
transmitting, by the service mesh, a notification to proxies of the individual microservices to check and report the current log levels and report the log levels; and
comparing, by the service mesh, the current log level to the error rate for the API call.

16. The computer system of claim 15, wherein upon comparing the current log level to the error rate for the API call, the current log level of one or more of the individual microservices is above the threshold log level for the error rate of the API call, retaining or lowering, by the service mesh, the current log level of the individual microservices; and
executing, by the service mesh, the API call at the current log level or a reduced log level applied to one or more of the individual microservices.

17. The computer system of claim 14, wherein dynamically changing, by the service mesh, the current log level for one or more of the individual microservices to increase an amount of information captured by the logs includes dynamically changing log levels of containers or pods hosting the one or more individual microservices.

18. The computer system of claim 14, further comprising:
executing, by the service mesh, the API call, and the API call fails;
checking, by the service mesh, a number of times the service mesh has retried to execute a failed API call;
upon checking the number of times, the service mesh has retried to execute the failed API call, the number of times is above a threshold number of retries, transmitting, by the service mesh, a notification to proxies of the individual microservices to check and report the current log levels; and
in response to the number of times being above the threshold level, dynamically changing, by the service mesh, the current log level for one or more of the individual microservices to increase an amount of information captured by the logs.

19. The computer system of claim 18, whereupon in response to the number of times being below the threshold level of retries, the service mesh re-executes the API call; and
upon re-execution of the API call, the API call successfully recovers and completes the transaction within the threshold number of retries, the service mesh maintains the current log levels of the one or more individual microservices.

20. The computer system of claim 14, further comprising:
reducing, by the service mesh, the new log level back to a previous log level upon a plurality of API calls successfully completing without errors for a threshold period of time at the new log level.

* * * * *